United States Patent
Guillemont et al.

(10) Patent No.: US 11,448,134 B2
(45) Date of Patent: Sep. 20, 2022

(54) EQUIPMENT DRIVE GEARBOX IN A TURBOMACHINE

(71) Applicant: Safran Transmission Systems, Colombes (FR)

(72) Inventors: Maxence Guillemont, Moissy-Cramayel (FR); Fanélie Drevon, Moissy-Cramayel (FR); Julien Viel, Moissy-Cramayel (FR)

(73) Assignee: Safran Transmission Systems, Colombes (FR)

( * ) Notice: Subject to any disclaimer, the term of this patent is extended or adjusted under 35 U.S.C. 154(b) by 125 days.

(21) Appl. No.: 15/759,764

(22) PCT Filed: Sep. 13, 2016

(86) PCT No.: PCT/FR2016/052302
§ 371 (c)(1),
(2) Date: Mar. 13, 2018

(87) PCT Pub. No.: WO2017/046505
PCT Pub. Date: Mar. 23, 2017

(65) Prior Publication Data
US 2019/0048801 A1    Feb. 14, 2019

(30) Foreign Application Priority Data
Sep. 14, 2015  (FR) ...................... 1558564

(51) Int. Cl.
*F02C 7/32* (2006.01)
*F16H 1/22* (2006.01)
*F02C 7/36* (2006.01)

(52) U.S. Cl.
CPC .................. *F02C 7/32* (2013.01); *F02C 7/36* (2013.01); *F16H 1/22* (2013.01);
(Continued)

(58) Field of Classification Search
CPC ...... F02C 7/32; F02C 7/36; F16H 1/22; F05D 2220/323; F05D 2260/4031
(Continued)

(56) References Cited

U.S. PATENT DOCUMENTS 2,548,858 A * 4/1951 Benedict ................... F02C 7/32
                                                                  415/122.1
7,500,365 B2 * 3/2009 Suciu ....................... F02C 7/32
                                                                  60/802

(Continued)

FOREIGN PATENT DOCUMENTS

EP         2 696 057 A1    2/2014
WO    WO 2005/054645 A1    6/2005
(Continued)

*Primary Examiner* — Michael Lebentritt
*Assistant Examiner* — Justin A Pruitt
(74) *Attorney, Agent, or Firm* — Blank Rome LLP

(57) ABSTRACT

A drive gearbox for turbomachine equipment, the drive gearbox having a main shaft intended to be rotationally connected to a power transmission shaft of a turbomachine. The main shaft has at least one bevel gear rotationally driving at least one piece of equipment. The gearbox has gear set with cylindrical gearwheels that have an input connected to the rotational drive to the main shaft and a plurality of outputs each intended to drive a piece of equipment. The gear set extends over an angular sector and the outputs are angularly spaced apart along the angular sector.

11 Claims, 3 Drawing Sheets

(52) U.S. Cl.
CPC .. *F05D 2220/323* (2013.01); *F05D 2250/141* (2013.01); *F05D 2260/4031* (2013.01)

(58) Field of Classification Search
USPC ...................................................... 415/122.1
See application file for complete search history.

(56) References Cited

U.S. PATENT DOCUMENTS

| | | | | |
|---|---|---|---|---|
| 8,347,637 | B2* | 1/2013 | Suciu | F02C 7/32 |
| | | | | 74/606 R |
| 8,905,191 | B2* | 12/2014 | Brandt | F02C 7/32 |
| | | | | 60/802 |
| 8,966,911 | B2* | 3/2015 | Ress, Jr. | F02C 7/275 |
| | | | | 60/788 |
| 9,845,735 | B2* | 12/2017 | Duong | F01D 15/12 |
| 10,145,260 | B2* | 12/2018 | Armange | F16H 1/225 |
| 2011/0154827 | A1* | 6/2011 | Ress, Jr. | F02C 7/36 |
| | | | | 60/772 |
| 2011/0284328 | A1* | 11/2011 | Brandt | F01D 25/18 |
| | | | | 184/6.11 |
| 2011/0289936 | A1* | 12/2011 | Suciu | F02C 7/32 |
| | | | | 60/802 |
| 2016/0245183 | A1* | 8/2016 | Viel | F02C 7/32 |
| 2019/0218978 | A1* | 7/2019 | Edwards | F02C 7/268 |

FOREIGN PATENT DOCUMENTS

| | | |
|---|---|---|
| WO | WO 2010/086422 A1 | 8/2010 |
| WO | WO 2014/195632 A1 | 12/2014 |
| WO | WO 2015/052430 A1 | 4/2015 |

\* cited by examiner

EQUIPMENT DRIVE GEARBOX IN A TURBOMACHINE

CROSS-REFERENCE TO RELATED APPLICATIONS

This application is a national stage of International Application No. PCT/FR2016/052302, filed on Sep. 13, 2016, which claims the benefit of French Patent Application No. 1558564, filed Sep. 14, 2015, the contents of each of which are incorporated herein by reference.

TECHNICAL FIELD

The present invention relates to drive gearboxes for equipment present in aircraft turbomachines.

BACKGROUND

In a turbomachine, various pieces of equipment, such as specifically electric generators for the production of electric power, pumps for pressure supply of fuel or oil, etc., are rotationally driven by a gear system connected to a shaft of the turbomachine.

Conventionally, as shown in FIG. 1, a turbomachine comprises, from upstream to downstream, a fan 12, a low pressure compressor 14, an intermediate casing 16, a high pressure compressor 18, a combustion chamber 20, a high pressure turbine 21 and a low pressure turbine 22. The air entering the turbomachine is divided into a primary air flow (arrow A) which circulates in a so-called primary air jet inside the low and high pressure compressors 14, 18 toward the combustion chamber 20 then through the high and low pressure turbines 21, 22, and into a secondary air flow (arrows B) which circulates in a so-called secondary air jet which by-passes the compressor 14, 18, the combustion chamber 20 and the turbine 21, 22. The intermediate casing comprises structural arms 24 which radially extend outwards. An arm 24 of the intermediate casing 16 contains a power transmission shaft 26 which extends substantially radially and the internal end of which is rotationally driven by the shaft 28 of the high pressure compressor 18. The radially external end of the power transmission shaft 26 is rotationally driven with one end of the main shaft of the turbomachine equipment drive gearbox 30. The box 30 is conventionally arranged in a nacelle forming a peripheral enclosure of the turbomachine. Such drive gearbox comprises a gear set comprising a succession of cylindrical mutually engaged gearwheels and the diameters of which are adapted for the axes of some wheels to be used as outputs for driving a piece of equipment at a given speed. Such a configuration is specifically interesting in that it makes it possible to correctly adapt the rotational speed to each piece of equipment. However, such mounting type reveals rather bulky and its installation in the nacelle requires a larger diameter of the turbomachine which should desirably be reduced, in order to reduce the aerodynamic drag of the turbomachine.

Thus, in order to reduce the diameter of the turbomachine and more specifically the thickness of the nacelle, it has been proposed to arrange the equipment drive gearbox and the equipment associated in a so-called inter-jet zone. In practice, such inter-jet zone is axially located at the high pressure compressor between the primary and secondary jets, i.e. between an internal annular wall which radially defines outwards the primary annular jet and an external annular wall which radially defines inwards the secondary annular jet. As can be seen in FIG. 1, the radial overall dimensions of the drive gearbox should be limited to prevent it from affecting the air flows in the primary and secondary jets. Besides, the axial overall dimensions should be reduced relative to a drive gearbox as mentioned above in order to prevent same to extend too far downstream and be affected by the heat radiation of the combustion chamber. Eventually, the peripheral overall dimensions of the drive gearbox should also be reduced relative to a position in the nacelle since the space between the jets is already used for the passage of various pipes and elements of the turbomachine and since the diameter at such spot is also smaller than at the nacelle.

For this purpose, it has been proposed to substitute the gear set with cylindrical wheels carried by the main shaft with bevel gears, with each bevel gear rotationally driving two pieces of equipment symmetrically arranged relative to a plane containing the axis of the main shaft. The pieces of equipment are thus distributed along the main shaft and driven thereby. If such type of mounting makes it possible to reduce the overall dimensions of the drive gearbox, it raises several difficulties, however. As a matter of fact, each bevel gear drives two pieces of equipment, which requires the same speed of rotation for said two pieces of equipment, which does not make it possible to have an optimum driving speed for each piece of equipment. Additionally, manufacturing bevel gears reveals difficult. Eventually, such a drive gearbox globally extends axially and is fixed by axially spaced apart attachment points. The result is that such a drive gearbox is more easily subject to side displacements.

SUMMARY

The main aim of the invention is specifically to bring a simple, efficient and economical solution to the problems raised by the prior art and described above.

For this purpose, it provides for a drive gearbox for equipment of a turbomachine comprising a main shaft intended to be rotationally connected to a power transmission shaft of a turbomachine, with the main shaft comprising at least one bevel gear rotationally driving at least one piece of equipment, characterized in that it comprises a gear set with cylindrical gearwheels comprising an input connected to the rotational drive to the main shaft and comprising a plurality of outputs each intended to drive a piece of equipment, with the gear set extending over an angular sector and the outputs being angularly spaced apart along the angular sector.

According to the invention, the drive gearbox comprises both at least one bevel gear which is able to drive for instance two pieces of equipment liable to rotate at the same speed, such as, for instance, electric generators and a gear set with cylindrical gearwheels for instance with straight or helical toothing which may drive, for instance, an oil separator and a pump, which can each rotate at a different speed.

Using a gear set extending on the periphery makes it possible to space apart the outputs thereof on the circumference about the axis of a turbomachine and thus to reduce the axial overall dimensions of the gearbox. Integrating a gear set comprising cylindrical gearwheels only makes it possible to simplify the design of the drive gearbox.

The drive gearbox according to the invention thus combines the advantages of a conventional drive gearbox which includes cylindrical wheels only and of a drive gearbox with bevel gears only, while eliminating the respective drawbacks of each of such drive gearboxes.

According to another characteristic of the invention, the drive gearbox comprises means for hanging the gear set on a casing of a turbomachine, arranged close to the circumferential ends of the gear set. Such attachment makes it possible to prevent the side movements of the box as in the prior art when a box with bevel gears is used.

According to still another characteristic of the invention, said at least one bevel gear is provided on the main shaft between one end connected to the input of the gear set and an opposite end carrying means for the rotational connection to a power transmission shaft.

The outputs of the gearbox may extend axially, i.e. with no radial or circumferential component, and from a face of the gearbox opposite the one facing the at least one bevel gear.

Such configuration appears to be particularly interesting since it makes it possible to arrange the pieces of equipment including fluid passage pipes at one end of the main shaft, which makes it easier to integrate the box into the turbomachine and more specifically into an inter-jet space of the turbomachine.

In a special configuration of the invention, the gear set extends on the periphery over an angular distance ranging from 45° to 180°, preferably over about 150°.

The bevel gear can for instance be rotationally connected to at least two pieces of equipment arranged symmetrically relative to each other relative to a plane containing the axis of the main shaft. The pieces of equipment can be electric generators.

Preferably, the drive gearbox according to the invention comprises only one bevel gear making it possible to drive two electric generators which can rotate at the same speed of rotation, with the other pieces of equipment being rotationally driven by the outputs of the gear set with cylindrical gearwheels.

The invention also relates to a turbomachine comprising a drive gearbox of the type disclosed above. The main shaft can extend in a plane containing the axis of the turbomachine and the gear set can be so arranged that the outputs angularly extend about the axis of the turbomachine.

The drive gearbox is preferably arranged radially in an annular space separating a primary annular air jet from a secondary annular air jet, and axially at the high pressure compressor, with the box being so arranged that the gear unit is arranged downstream of said at least first bevel gear.

BRIEF DESCRIPTION OF THE DRAWINGS

The invention will be better understood and other details, advantages and characteristics of the invention will appear upon reading the following description given as a non restrictive example, while referring to the appended drawings, wherein.

DETAILED DESCRIPTION

Figure 2:
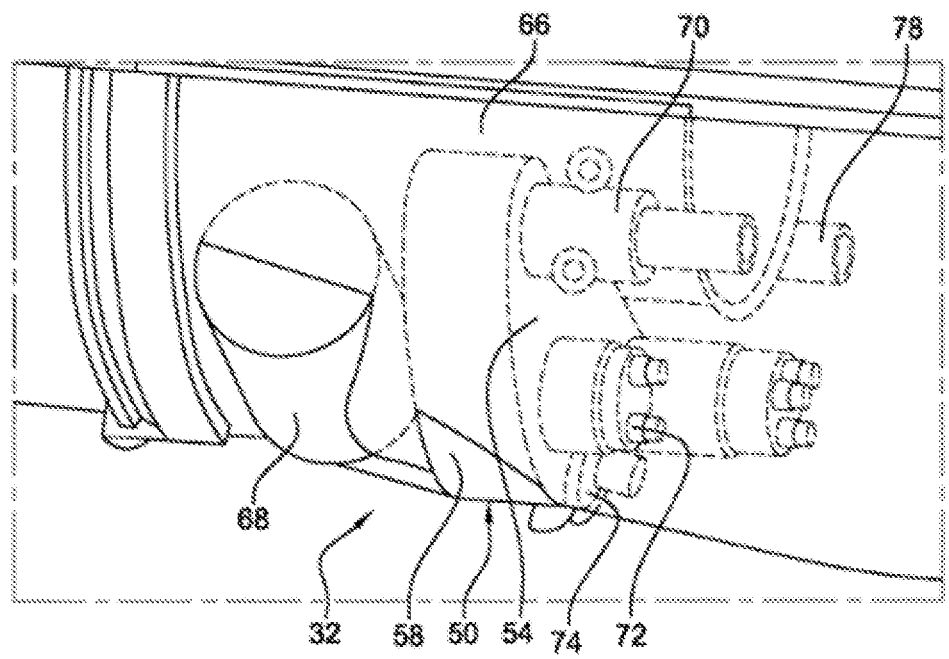
FIG. 2 is a schematic view of a drive gearbox according to the invention arranged in an inter-jet space.

FIG. 2 shows a drive gearbox 32 according to the invention arranged in an inter-jet space defined between the primary and secondary air flow jets of a turbomachine.

Figure 3:
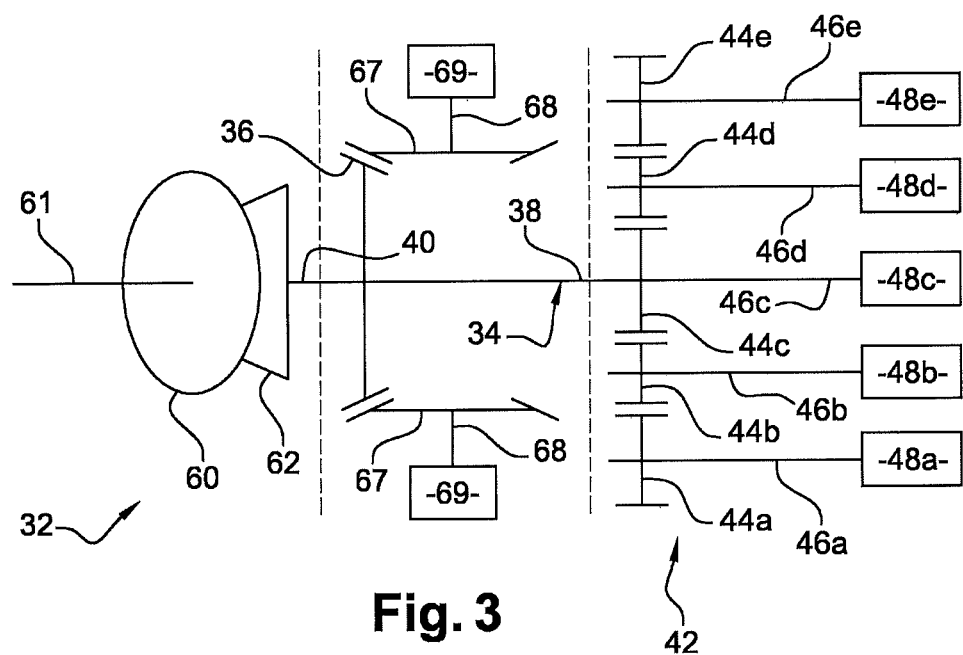
FIG. 3 is a schematic representation of the cinematic chain of a drive gearbox according to the invention.
Figure 4:
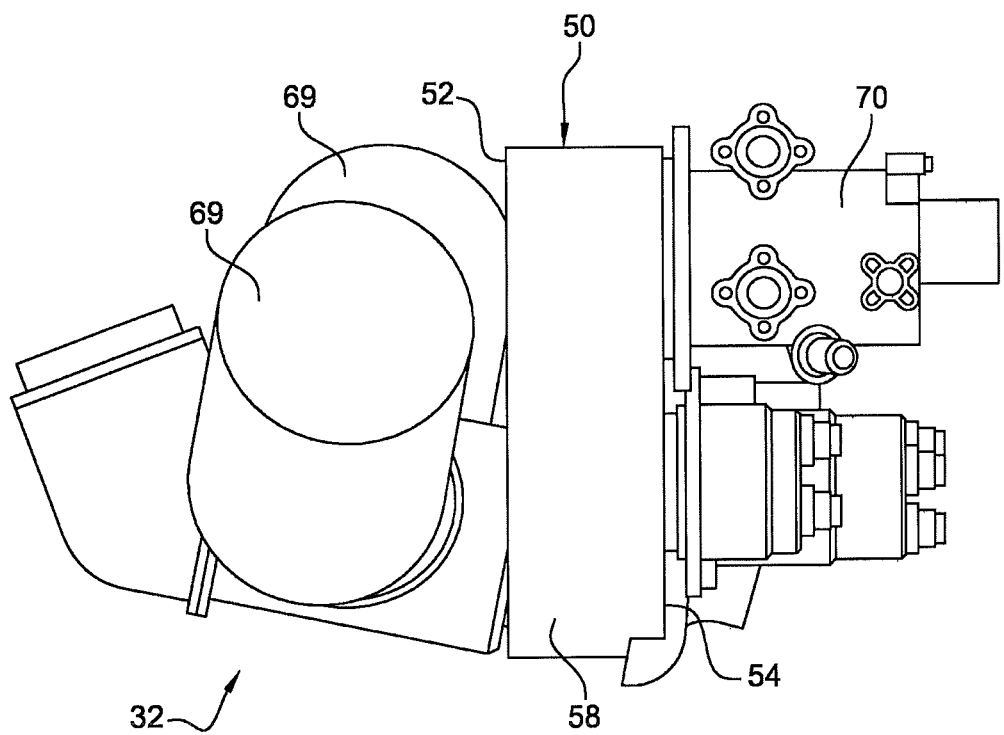
FIG. 4 is a perspective and side schematic view of the drive gearbox according to the invention.
Figure 5:
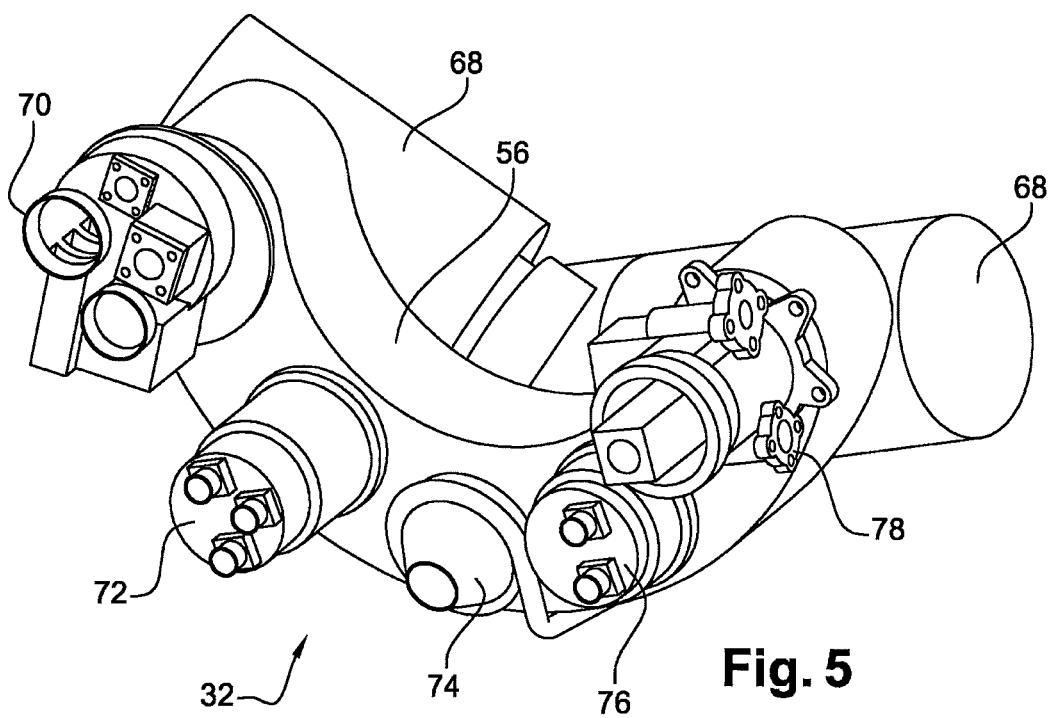
FIG. 5 is a schematic view in perspective and in the upstream direction of the drive gearbox of FIG. 4.

FIG. 3 more specifically shows the drive gearbox 32 according to the invention, which comprises a main shaft 34 carrying a bevel gear 36 arranged between a first end 38 and a second end 40 of the main shaft 34. The first end 38 of the main shaft 34 is connected to the input of a gear set 42 with cylindrical gearwheels 44a, 44b, 44c, 44d, 44e such as gearwheels with straight or helical toothing. Some of the gearwheels 44a, 44b, 44c, 44d, 44e have an output 46a, 46b, 46c, 46d, 46e formed by a central axis of the gearwheel 44a, 44b, 44c, 44d, 44e which rotationally drives a given piece of equipment 48a, 48b, 48c, 48d, 48e. The gear set 42 is mounted in a rigid envelope 50 forming an external envelope or an external fairing.

Figure 1:
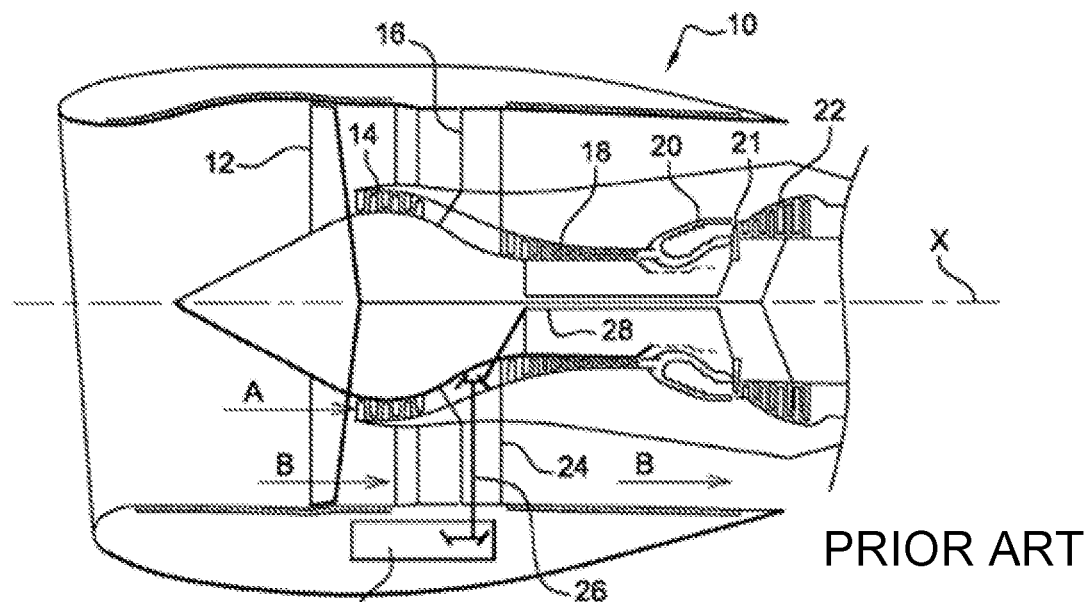
FIG. 1 is a schematic sectional view of a turbomachine according to the prior art.

According to the invention, the gear set 42 and the external envelope 50 thereof extend over an angular sector, i.e. over an arc. The outputs 46 are angularly spaced apart along the angular sector. In the embodiment according to the invention, the arc is more specifically an arc of circle, the centre of which is positioned on the axis X of the turbomachine (FIG. 1). The gear set 42 thus extends over the periphery about the axis X of the turbomachine and the outputs 46a, 46b, 46c, 46d, 46e of the gear set of the pieces of equipment 48a, 48b, 48c, 48d, 48e are spaced apart on the periphery about the axis X of the turbomachine, which makes it possible to distribute the pieces of equipment 48a, 48b, 48c, 48d, 48e on the periphery about the high pressure compressor. The external envelope or fairing 50 comprises an upstream wall 52 and a downstream wall 54 substantially parallel to each other and substantially perpendicular to the axis X of the turbomachine. The edges of the upstream and downstream walls are connected by two internal 56 and external 58 radially bent walls which extend on the periphery. The internal wall 56 has a radially internal face which is concavely bent and the external wall 58 has a radially external face which is convexly bent. The outputs 46 of the gear set 42 extend in the downstream direction relative to the gear set 42 and go through the downstream wall 54 of the external envelope 50.

The second end 40 of the main shaft 34 is connected to connection means for rotational connection to a power transmission shaft connected to rotationally drive the shaft of the high pressure compressor, as is well-known to the skilled person in the art. Such connection means comprise a transfer shaft 61 connected through a couple of bevel gears 60, 62 to the end 40 of the main shaft 34 (FIG. 3), with the end of the transfer shaft 61 opposite the one connected to said second end 40 of the main shaft 34 being connected through another couple of bevel gears to the power transmission shaft. Using a transfer shaft 61, inserted into the cinematic chain between the power transmission shaft and the main shaft 34, enables a correct geometrical adaptation of the drive gearbox 32 to the environment thereof.

Figure 6:
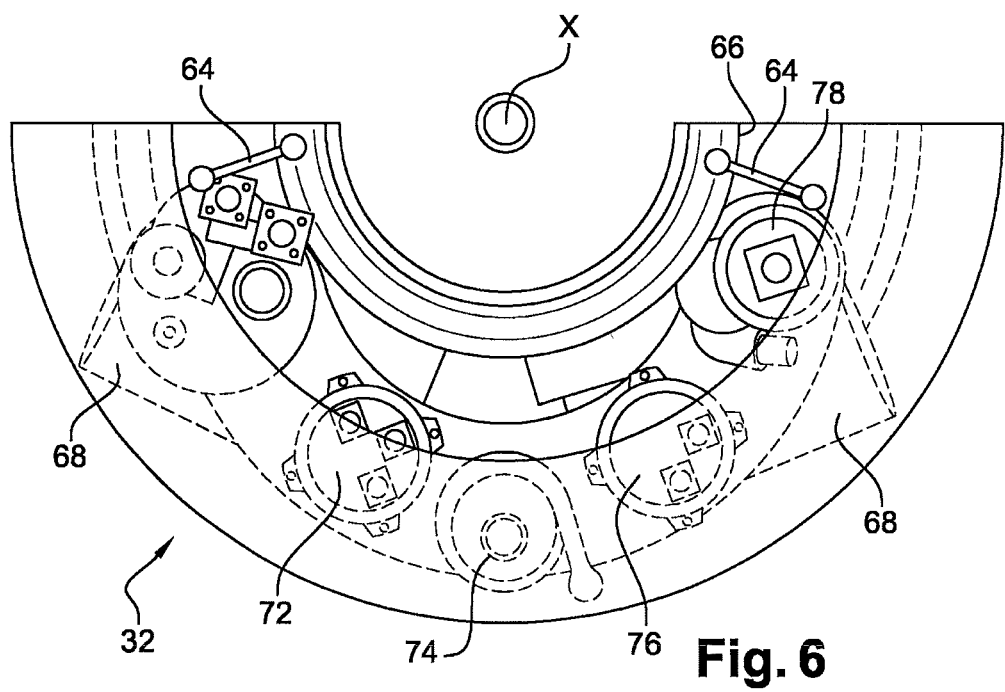
FIG. 6 is a schematic view in the upstream direction of the drive gearbox of FIG. 4.

As shown in FIG. 6, the angular ends of the gear set 42 comprise means for attachment 64 to the wall 66 defining radially outwards the primary air flow jet. Such attachment means 64 are carried by the external fairing 50 of the gear set 42 and are for instance of the connecting rod, rod or fixing bracket types.

In the possible embodiments of the invention, the gear set 42 extends over an angular distance ranging from 45° to 180°. In the practical embodiment shown in the Figures, the gear set 42 extends over an angular distance of about 150°.

In one exemplary embodiment of the invention, the bevel gear 36 of the main shaft engages with two bevel gears 67, each comprising one output 68 rotationally driving a piece of equipment 69. The two pieces of equipment 69 are arranged symmetrically relative to each other and relative to a plane containing the axis of the main shaft 34. Such two pieces of equipment are for instance electric starter generators used to start the turbomachine and, in flight, to supply current to recreational equipment inside the aircraft. Using bevel gears thus makes it possible to install bulky equipment in the inter-jet space.

In one exemplary embodiment of the invention, the gear set comprises five outputs 46a, 46b, 46c, 46d, 46e among which the first one is connected to a unit 70 for the lubrication of the rolling bearings of the turbomachine and the bearings of the drive gearbox. The second output is connected to a permanent magnet generator 72 intended to supply power to the electronic navigation and control components of the aircraft. The third output is connected to an oil separator 74 which is connected to the lubrication unit. The fourth output is connected to a permanent magnet alternator 76 intended to supply power to electronic navigation components of the engine, such as the calculator known as FADEC (Full Authority Digital Engine Control). The fifth output is connected to a fuel pump 78.

The drive gearbox 32 according to the invention could also comprise several bevel gears arranged between the first and second ends.

The invention claimed is:

1. A turbomachine comprising a drive gearbox for pieces of equipment, the drive gearbox comprising a main shaft intended to be rotationally connected to a power transmission shaft of a turbomachine, wherein the main shaft comprises at least one bevel gear rotationally driving at least one piece of equipment, wherein the drive gearbox comprises a gear set, the gear set comprising:

an input connected to the main shaft; and
a plurality of cylindrical gearwheels comprising all cylindrical gearwheels of the drive gearbox, each of said plurality of cylindrical gearwheels comprising an axis of rotation and an output, each output configured to drive one of the at least one piece of equipment,
wherein the gear set extends over an angular sector and each output of the plurality of cylindrical gearwheels is angularly spaced apart about an axis of the turbomachine, along the angular sector,
wherein each output of the plurality of cylindrical gearwheels extends away from the respective cylindrical gearwheel in a downstream direction relative to a primary airflow in the turbomachine,
wherein the drive gearbox is radially arranged in an annular space separating a primary annular air jet and a secondary annular air jet, and axially at a high pressure compressor, with the drive gearbox being so arranged that the gear set is arranged downstream of said at least one bevel gear.

2. The turbomachine according to claim 1, further comprising means for hanging the gear set on a casing of the turbomachine, arranged at peripheral ends of the gear set.

3. The turbomachine according to claim 1, wherein the at least one bevel gear is arranged on the main shaft between one end of the main shaft connected to the input of the gear set and one opposite end of the main shaft carrying a means for rotational connection to the power transmission shaft.

4. The turbomachine according to claim 1, wherein the gear set extends circumferentially with respect to the axis of the turbomachine over an angular distance ranging from 45° to 180°.

5. The turbomachine according to claim 1, wherein said at least one bevel gear is connected to at least two pieces of equipment, arranged symmetrically relative to each other relative to a plane containing an axis of the main shaft.

6. The turbomachine according to claim 5, wherein said pieces of equipment are electric generators.

7. The turbomachine according to claim 1, comprising a plurality of pieces of equipment and only one bevel gear for rotationally driving the plurality of pieces of equipment.

8. The turbomachine according to claim 4, wherein the angular distance ranges between 150° to 180°.

9. The turbomachine according to claim 1, wherein the at least one bevel gear is arranged on the main shaft between one end of the main shaft connected to the input of the gear set and one opposite end of the main shaft carrying a means for rotational connection to the power transmission shaft.

10. The turbomachine according to claim 1, wherein each of the at least one bevel gear is distributed axially along the main shaft between a first distal end of the main shaft connected to each of the plurality of cylindrical gearwheels and an opposite second end of the main shaft carrying a means for rotational connection the power transmission shaft, such that all of the plurality of cylindrical gearwheels are arranged at the first distal end.

11. The turbomachine according to claim 1, wherein each output of the plurality of cylindrical gearwheels comprises an upstream end terminating at a downstream side of the respective cylindrical gearwheel and a downstream end arranged downstream from the upstream end and configured to connect to a respective one of the at least one piece of equipment.

* * * * *